(12) United States Patent
Vashina

(10) Patent No.: US 10,555,511 B2
(45) Date of Patent: Feb. 11, 2020

(54) STEERABLE FISHING LURE

(71) Applicant: Gerald Vashina, Macungie, PA (US)

(72) Inventor: Gerald Vashina, Macungie, PA (US)

( * ) Notice: Subject to any disclaimer, the term of this patent is extended or adjusted under 35 U.S.C. 154(b) by 211 days.

(21) Appl. No.: 15/489,627

(22) Filed: Apr. 17, 2017

(65) Prior Publication Data
US 2017/0280699 A1 Oct. 5, 2017

Related U.S. Application Data

(63) Continuation-in-part of application No. 14/035,357, filed on Sep. 24, 2013, now Pat. No. 9,622,461.

(51) Int. Cl.
*A01K 85/16* (2006.01)
*A01K 85/00* (2006.01)

(52) U.S. Cl.
CPC .............. *A01K 85/16* (2013.01); *A01K 85/00* (2013.01)

(58) Field of Classification Search
CPC ........ A01K 85/00; A01K 85/12; A01K 85/16; A01K 85/18
USPC ...... 43/4.5, 42.03, 42.11, 42.12, 42.2, 42.21, 43/42.22, 42.23, 42.35, 42.49
See application file for complete search history.

(56) References Cited

U.S. PATENT DOCUMENTS

| | | | | |
|---|---|---|---|---|
| 1,694,195 A * | 12/1928 | Watts | ...................... | A01K 85/16 43/26.2 |
| 2,464,465 A * | 3/1949 | Steinhauer | ............. | A01K 85/16 43/26.2 |
| 2,567,340 A * | 9/1951 | Lytle | ...................... | A01K 91/10 43/15 |
| 2,594,981 A * | 4/1952 | Ohlund | ................... | A01K 85/12 43/26.2 |
| 2,607,151 A * | 8/1952 | Morris | ................... | A01K 85/18 43/26.2 |
| 3,645,033 A * | 2/1972 | Kress | ...................... | A01K 85/16 43/26.2 |
| 4,676,020 A * | 6/1987 | Taylor | .................... | A01K 85/16 43/42.02 |
| 5,035,075 A * | 7/1991 | Pearce | ................... | A01K 85/18 43/26.2 |
| 5,088,227 A * | 2/1992 | Toner | ..................... | A01K 85/00 43/42.02 |
| 5,337,508 A * | 8/1994 | Pfeiffer | .................. | A01K 85/16 43/42.03 |
| 5,829,184 A * | 11/1998 | Studanski | .............. | A01K 85/14 43/43.13 |

(Continued)

*Primary Examiner* — Lisa L Tsang
(74) *Attorney, Agent, or Firm* — Joseph E. Maenner; Maenner & Associates, LLC

(57) ABSTRACT

A method of redirecting a track of a fishing lure on a fishing line is provided. The fishing lure has a body, a fishing lure longitudinal axis extending along a length of the body, a line tie extending outwardly from the body, and a re-positioning mechanism mounted entirely inside the body and connected to the line tie. The re-positioning mechanism is activated by the fishing line. The method includes the steps of using a fishing pole, casting the fishing lure into a body of water; while the fishing lure is in the water, reeling in the fishing lure; and moving the line tie between a first position and a second position such that only the movement of the line tie between the first position and the second position changes a direction of travel of the fishing lure while the lure is being reeled in.

13 Claims, 6 Drawing Sheets

(56) References Cited

U.S. PATENT DOCUMENTS

| | | | | |
|---|---|---|---|---|
| 5,832,654 A | * | 11/1998 | McQueeny | A01K 85/16 43/42.04 |
| 6,050,022 A | * | 4/2000 | Brick | A01K 85/18 43/26.2 |
| 6,122,854 A | * | 9/2000 | Kinnear | A01K 85/16 43/42.02 |
| 6,665,976 B2 | * | 12/2003 | West | A01K 85/01 43/17.1 |
| 2002/0095854 A1 | * | 7/2002 | Kinnear | A01K 85/16 43/42.03 |
| 2002/0108292 A1 | * | 8/2002 | Pearce | A01K 85/16 43/26.2 |

* cited by examiner

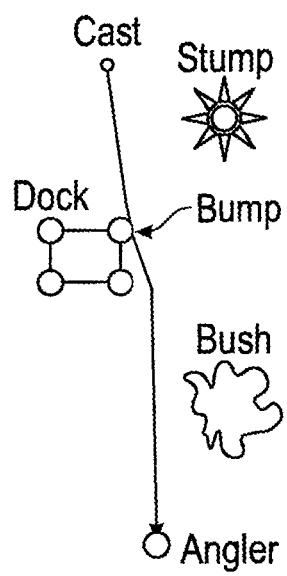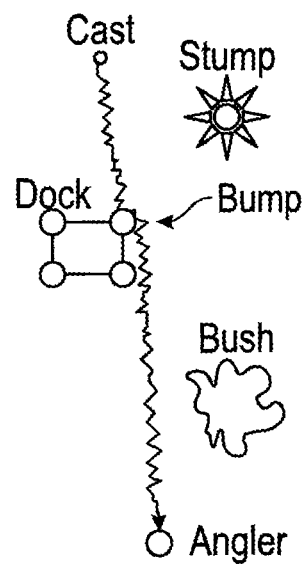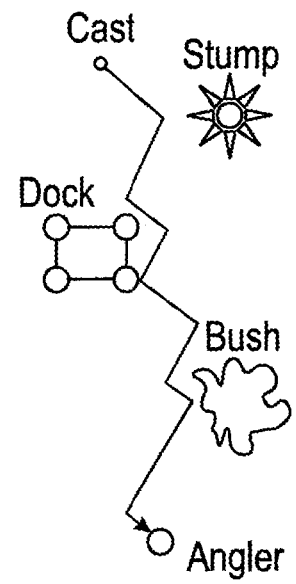
FIG. 1A
(Prior Art)
FIG. 1B
(Prior Art)
FIG. 1C
(Prior Art)

STEERABLE FISHING LURE

CROSS-REFERENCE TO RELATED APPLICATION

The present application is a Continuation-in-Part application of U.S. patent application Ser. No. 14/035,357 (allowed), filed on Sep. 24, 2013, which is incorporated herein by reference in its entirety.

BACKGROUND OF THE INVENTION

Field of the Invention

The present invention relates to a fishing lure that can be steered by a fisherman after the lure has been cast into a body of water.

Background of the Invention

Fishing lures have appeared on the market that may be steered in either a left or a right direction as a fisherman, or "angler", pulls on the line to which the fishing lure is attached. These lures have been developed in response to an angler's desire to direct the lure to locations where fish tend to congregate, such as around trees, tree stumps, docks, rocks, or anything where they can hide to ambush prey and stay away from currents. A drawback to many of these lures, however, is that their direction must be set prior to casting and the direction cannot be reversed (i.e., left-to-right or right-to-left) while the lure is in the water. As shown FIGS. 1A and 1B, with the direction of retrieval being from the top of the page toward the bottom of the page, a prior art lure can be retrieved in a straight line in the direction of retrieval (shown by the arrow in FIG. 1A) or a straight line at an angle to the direction of retrieval (shown by the arrow in FIG. 1B) if the lure is pre-adjusted prior to casting so that the lure will travel at an angle. In other lures, while the direction of the lure may be changed while the lure is in the water, the direction cannot be totally controlled by the angler.

The need exists today for a device that gives the angler the ability to select the direction in which the lure moves while the lure is in the water and is being dragged through the water by the angler.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, the present invention is a method of redirecting a track of a fishing lure on a fishing line. The fishing lure has a body, a fishing lure longitudinal axis extending along a length of the body, a line tie extending outwardly from the body, and a re-positioning mechanism connected to the line tie. The re-positioning mechanism is activated by the fishing line. The method includes the steps of using a fishing pole, casting the fishing lure into a body of water; while the fishing lure is in the water, reeling in the fishing lure; and moving the line tie between a first position and a second position such that only the movement of the line tie between the first position and the second position changes a direction of travel of the fishing lure while the lure is being reeled in.

In another embodiment, the present invention is a method of redirecting a track of a fishing lure on a fishing line. The fishing lure has a body having a central longitudinal axis, a re-positioning mechanism, and a line tie having a first end connected to the re-positioning mechanism and extending outwardly of the body, and a second end connected to the fishing line. The method comprises the steps of using a fishing pole, casting the fishing lure into a body of water; while the fishing lure is in the water and the second end of the line tie is in a first position, causing the fishing lure to travel in a first traveling direction; activating the re-positioning mechanism, thereby moving the line tie such that the second end is moved to a second position; and changing a direction of travel of the fishing lure to a second traveling direction.

In still another embodiment, the present invention is a method of redirecting a track of a fishing lure on a fishing line. The fishing lure has a body, a fishing lure longitudinal axis extending along a length of the body, a re-positioning mechanism activated by the fishing line, and a line tie attached to the re-positioning mechanism and extending outwardly from the body. The method comprises the steps of using a fishing pole, casting the fishing lure into a body of water; while the fishing lure is in the water, pulling on the fishing line; releasing tension on the fishing line, thereby cycling the line tie between a first position on a first side of the fishing lure longitudinal axis and a second position on a second side of the fishing lure longitudinal axis; and changing a direction of travel of the fishing lure to a first direction when the line tie is in the first position and to a second direction when the line tie is in the second position.

BRIEF DESCRIPTION OF THE DRAWINGS

The accompanying drawings, which are incorporated herein and constitute part of this specification, illustrate the presently preferred embodiments of the invention, and, together with the general description given above and the detailed description given below, serve to explain the features of the invention. In the drawings:

FIG. 1A is a schematic view showing a prior art lure being reeled in a relatively straight direction;

FIG. 1B is a schematic view showing a prior art lure being reeled in a relatively straight direction but with "short range pseudo-erratic" direction changes;

FIG. 1C is a schematic view showing a prior art lure being reeled with a gravitational acting mechanism in which there is only one direction change possible at each turning point;

DETAILED DESCRIPTION

Figure 2:
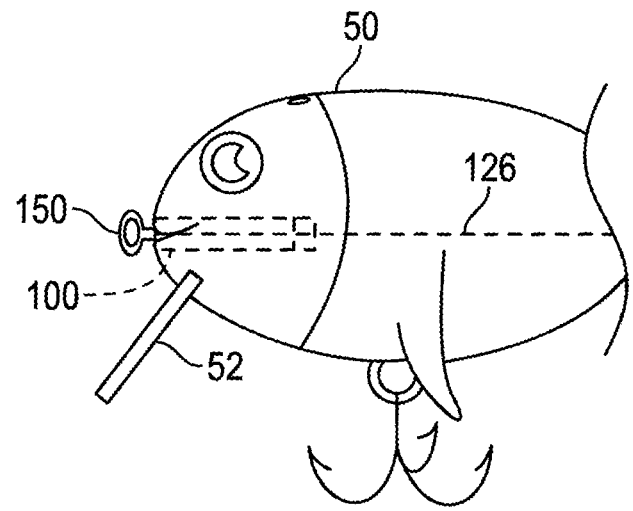
FIG. 2 shows a lure assembly according to an exemplary embodiment of the present invention being fixedly inserted into a lure.

In the drawings, like numerals indicate like elements throughout. Certain terminology is used herein for convenience only and is not to be taken as a limitation on the present invention. The term "forward" refers to the front or mouth end of the inventive device and the term "aft" refers to the rear or tail end of the inventive device. The term "tie" refers to a portion of the inventive device to which another device is attached. A tie can be a line tie, including a tie hole, at the forward end of the inventive device to which fishing line from a fishing pole is attached. Additionally, a tie can be a hook tie, including a tie hole, at the aft end of the device to which a fish hook is attached. The terminology includes the words specifically mentioned, derivatives thereof and words of similar import. The embodiments illustrated below are not intended to be exhaustive or to limit the invention to the precise form disclosed. These embodiments are chosen and described to best explain the principle of the invention and its application and practical use and to enable others skilled in the art to best utilize the invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Unless explicitly stated otherwise, each numerical value and range should be interpreted as being approximate as if the word "about" or "approximately" preceded the value of the value or range.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Referring now to the figures, a steerable fishing lure assembly 100 according to a first exemplary embodiment of the present invention is shown. Lure assembly 100 includes an internal mechanism that allows an angler to redirect the direction in which a lure "swims" as the angler reels in the lure after a cast. As the angler is reeling in the lure, depending upon configuration of the lure assembly, the fishing lure in which the inventive lure assembly is contained can track at an angle to the left or right relative to the direction in which the lure is being reeled.

Alternatively, the inventive lure assembly can be configured within the lure to cause the lure to travel in the direction in which the lure is being reeled, but also to cause the lure to "dive" deeper into the water or to rise toward the surface of the water.

Figure 3:
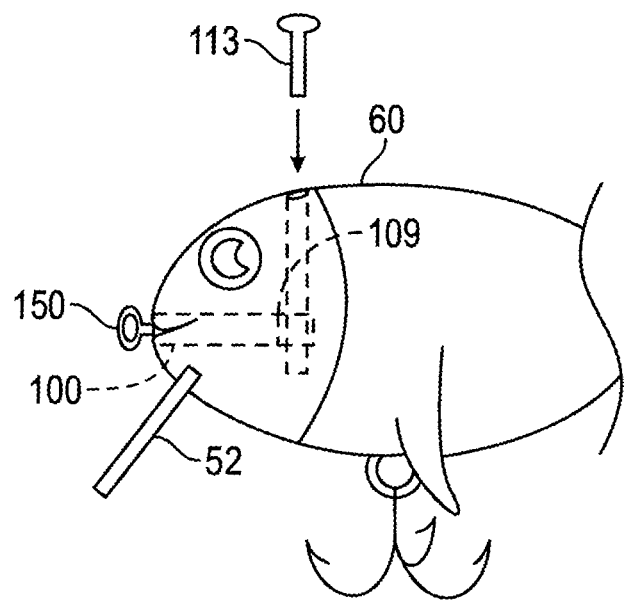
FIG. 3 shows a lure assembly according to an exemplary embodiment of the present invention being removably inserted into a lure.

As shown in FIG. 2, lure assembly 100 may be permanently incorporated into a fishing lure 50 or, alternatively, as shown in FIG. 3, lure assembly 100 may be removably inserted into a fishing lure 60. Each of lure 50, 60 (hereon identified simply as "lure 50") can include a front lip 52 that stabilizes lure 50 and maintains lure 50 in a generally "upright" position, as shown in FIGS. 2 and 3, respectively. Front lip 52 is also used to assist in causing lure 50 to dive deeper into the water as lure 50 is being reeled in.

As shown in FIGS. 4A-4D, lure assembly 100 includes a generally hollow body 102 having an inner surface 104. A central longitudinal axis 106 extends through body 102. Body 102 includes a forward end 108 and an aft end 110 disposed distally from forward end 108. Body 102 is generally tubular in shape. Alternatively, body 102 can be other shapes, such as, but not limited to, rectangular, hexagonal, etc.

In an exemplary embodiment, not shown, body 102 may be single piece. Body 102 may be constructed from a polymer (such as HIPS, nylon, acetal), a light metal (such as brass or aluminum), a composite (such as carbon fiber, reinforced epoxy), or other suitable material.

Lure assembly 100 includes re-positioning mechanism that includes a carrier 120 being longitudinally slidable in a forward/aft direction along central longitudinal axis 106. Carrier 120 is biased toward a rear position by a biasing member 122. In an exemplary embodiment, biasing member 122 can include one or a plurality of helical springs configured to extend in a non-biased condition, although those skilled in the art will recognize that other biasing members can be used.

A rotor assembly includes a gear 130 having gear teeth 131 that is rotatable mounted on carrier 120. Gear 130 rotates about a central gear axis 132. As shown in FIGS. 4A-4D, central gear axis 132 can be offline from central longitudinal axis 106, although those skilled in the art will recognize that central gear axis 132 can be located along central longitudinal axis 106.

Gear 130 includes a pivot mount 134 that is located off-axis from central gear axis 132 such that pivot mount 134 on gear 130 acts as a cam mechanism, wherein rotation of gear 130 rotates pivot mount 134 in an arc around central gear axis 132.

A line tie 140 has a connected end 142 that is rotatably connected to pivot mount 134 and a free end 144, distal from connected end 142, that extends outwardly of body 102 at an opening 111, located along central longitudinal axis 106, as well as outwardly of lure 50. A fishing line (not shown) or other device or part of a device connected to the fishing line is connected to free end 144 of line tie 140 so that, as the fishing line is reeled in, the fishing line pulls on line tie 140 to reel in lure 50.

A rack 150 having teeth 152 extends longitudinally within body 102. Rack 150 is mounted in body 102 such that rack teeth 152 are in engagement with gear teeth 131. Carrier 120 can slide in a forward/aft direction within body 102 such that gear 120 rotates due to the engagement of gear teeth 131 with rack teeth 152.

As FIGS. 4A-4D illustrate, as carrier 120 moves longitudinally through body 102, gear 130 rotates due to its engagement with rack 150, causing free end 144 of line tie 140 to oscillate in a back-and-forth direction in only a single plane, from one side of longitudinal axis 106 to an opposing side of longitudinal axis 106. The oscillation of line tie 140 from one side of longitudinal axis 106 to an opposing side of longitudinal axis 106 results in lure 50 changing direction as lure 50 is being reeled in.

Gear 130 moves along rack 150 as a result of an angler (not shown) applying tension to line tie 140 by reeling in lure 50, and then releasing the tension on line tie 140. The application of tension to line tie 140 naturally causes carrier 120 to be pulled forward within body 102 from the position shown in FIG. 4A to the position shown in FIG. 4D, compressing biasing member 122. When the tension is released, biasing member 122 can extend, forcing carrier 120 aft within body 102, from the position shown in FIG. 4D to the position shown in FIG. 4A.

Figure 4A:
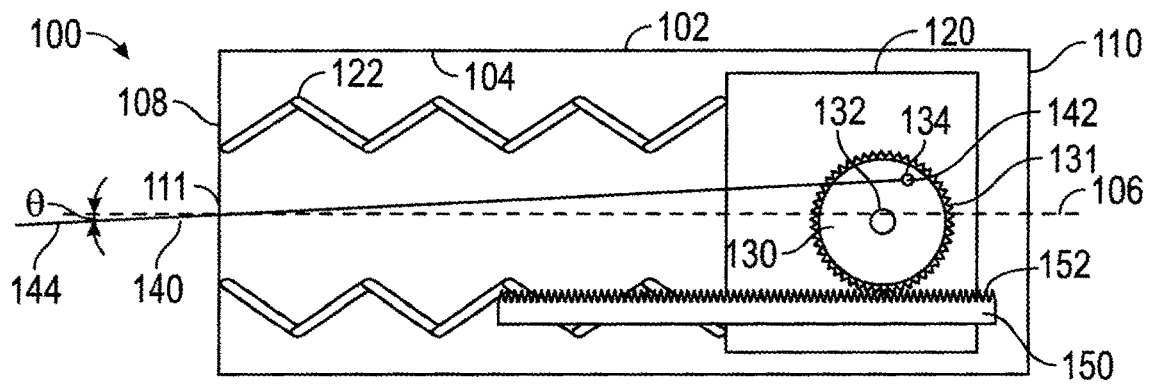
FIG. 4A shows a lure assembly according to an exemplary embodiment of the present invention in a non-line tie tension position.
Figure 4B:
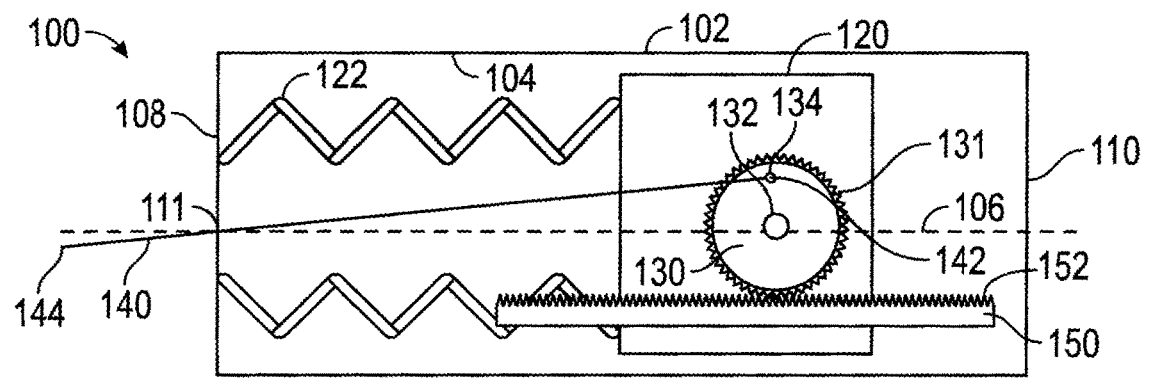
FIG. 4B shows the lure assembly of FIG. 4A when line tie tension is beginning to be applied to the lure assembly.
Figure 4C:
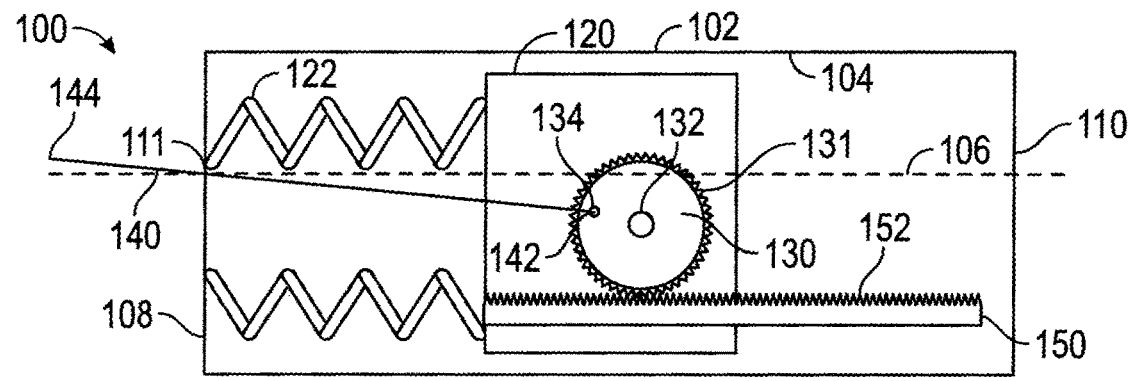
FIG. 4C shows the lure assembly of FIG. 4B when additional line tie tension is being applied to the lure assembly.
Figure 4D:
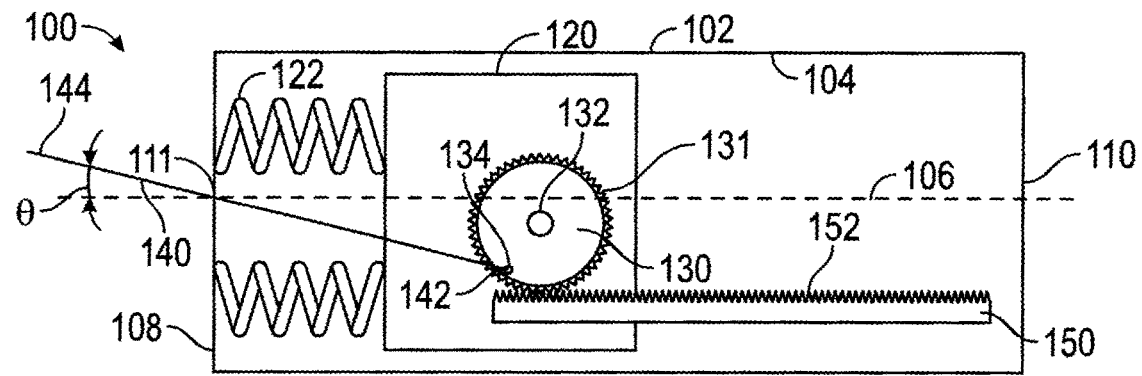
FIG. 4D shows the lure assembly of FIG. 4C when full line tie tension is being applied to the lure assembly.

As carrier 120 moves back and forth along longitudinal axis 106, an angle ⊖ between line tie 140 and longitudinal axis 106 changes, with ⊖ being a positive value above longitudinal axis 106 as shown in FIG. 4D and ⊖ being a negative value below longitudinal axis 106 as shown in FIG. 4A.

The movement of line tie 140 is the only resultant external movement of activating the re-positioning mechanism, which means that no other external mechanism, such as a propeller, a rudder, or other device is activated or released as a result of movement of line tie 140.

While a "line tie" is discussed, those skilled in the art will recognize that any device or portion of a device located downstream of a fishing line and is attached to lure 50 is contemplated as being covered by the term "line tie".

Figures 5A, 5B:
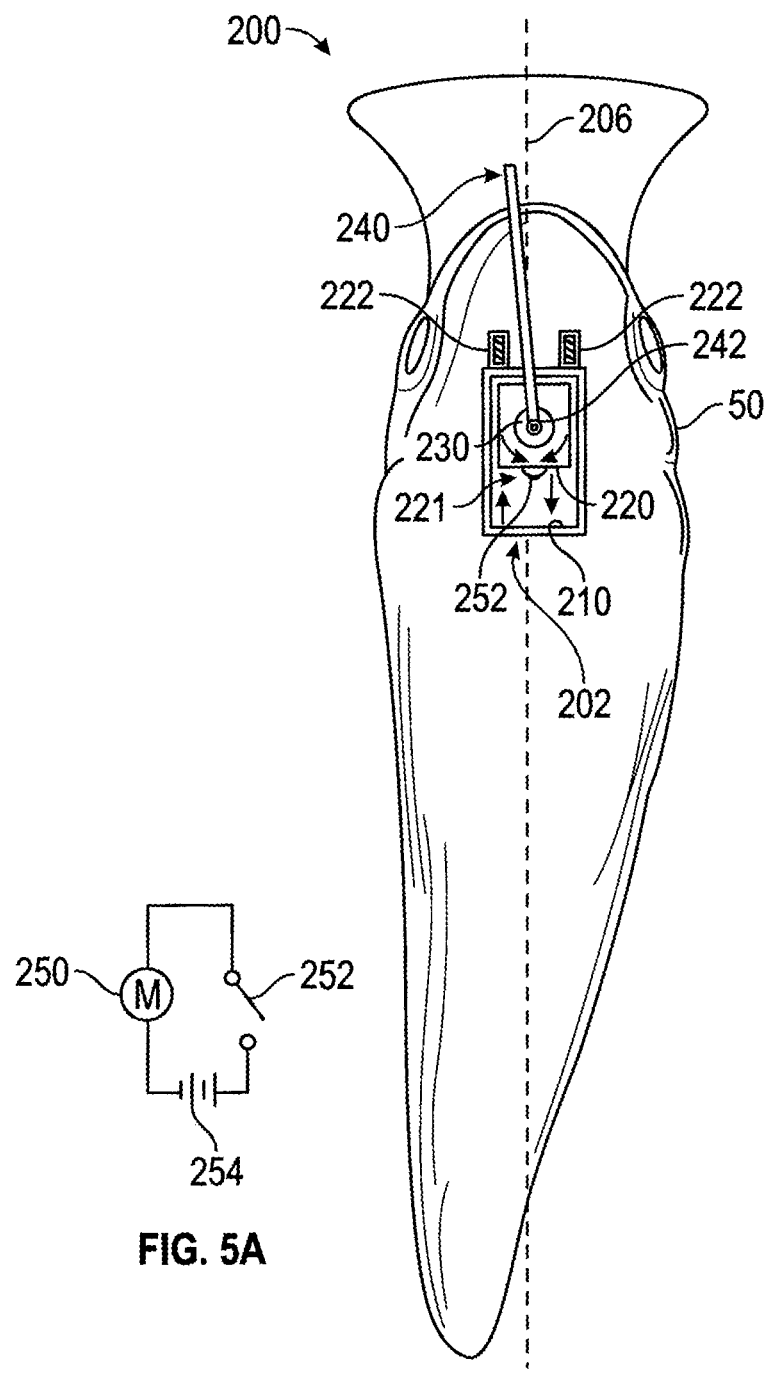
FIG. 5A shows an exemplary electrical schematic diagram used with the lure assembly shown in FIG. 5B.
FIG. 5B shows a lure assembly according to an alternative exemplary embodiment of the present invention.

An alternative embodiment of a steerable fishing lure assembly 200 is shown in FIGS. 5A and 5B. Lure assembly 200 is similar to lure assembly 100 except that, instead of using gear 130 and rack 150 to rotate gear 130, a connected end 242 of a line tie 240 is connected to a pivot mount 234 on a wheel 230. Wheel 230 is operatively connected to a driver that rotates wheel a number of rotational degrees when an aft face 221 of a carrier 220 engages aft end 210 of body 202.

In an exemplary embodiment, the driver can be a motor 250 that is activated when a motor switch 252 on aft face 221 of carrier 230 engages aft end 210 of body 202. Activation of motor switch 252 activates motor 250 to rotate, thereby rotating wheel 230 as well.

Motor 250 can be configured to always rotate a predetermined number of degrees per activation of switch 252. Alternatively, motor 250 can be configured to rotate as long as switch 252 is engaged with aft end 210 of body 202. Additionally, motor 250 can be configured to reverse direction after each operating cycle. Rotation of wheel 230 activates and moves line tie 240 in a manner similar to the movement of line tie 140 above with respect to lure assembly 100 except that line tie 240 only exhibits angular movement with respect to a central longitudinal axis 206 of lure body 202 when motor 250 is rotating wheel 230. When carrier 220 is moving longitudinally along body 202 and wheel 230 is not rotating, line tie 240 is not oscillating relative to longitudinal axis 206.

To operate motor 250, a power source, such as batteries 254, shown in the schematic drawing of FIG. 5A, are provided in lure 50. Batteries 254 can be rechargeable and/or replaceable.

Similar to biasing member 122 used to return carrier 120 to an unbiased position, a biasing member 222 can be used to return carrier 220 to an unbiased position when tension on line tie 240 is released.

While motor 250 is shown as the device used to rotate wheel 230, those skilled in the art will recognize that other mechanisms, such as purely mechanical mechanisms including a ratchet assembly, can be used to rotate wheel 230 a predetermined angular amount each time that carrier 220 reaches its maximum travel toward aft end 210 of body 202.

Figures 6A, 6B:
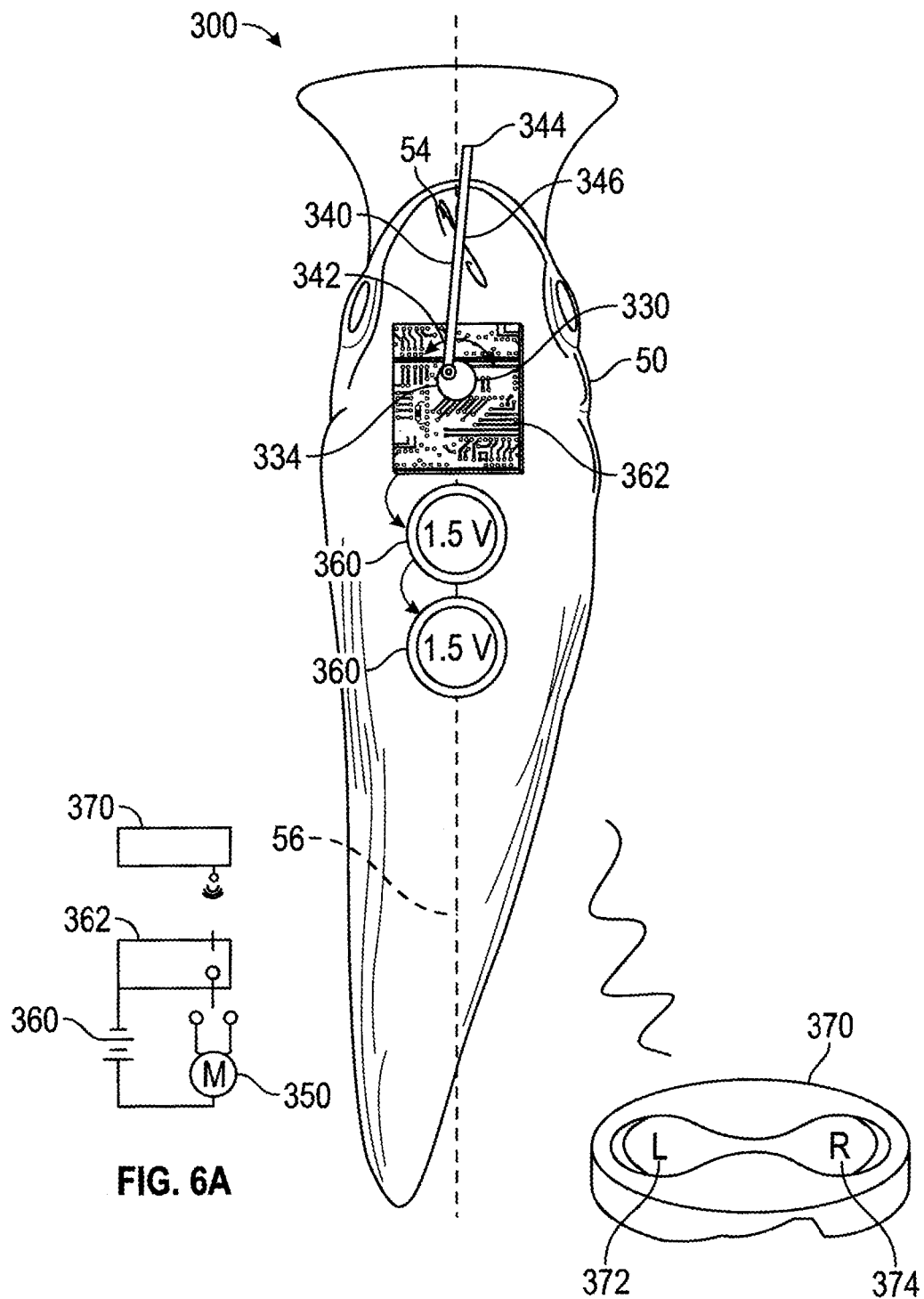
FIG. 6A shows an exemplary electrical schematic diagram used with the lure assembly shown in FIG. 6B.
FIG. 6B shows a lure assembly according to another alternative exemplary embodiment of the present invention.

An alternative embodiment of a steerable fishing lure assembly 300 is shown in FIGS. 6A and 6B. Lure assembly 300 uses a remotely operated motor 350 that is operatively connected to a wheel 330 to rotate wheel 330. Wheel 330 has a pivot mount 334 that rotates off-center when wheel 330 rotates. A line tie 340 has a connected end 342 pivotally mounted to pivot mount 334 and a free end 344 that extends outside of lure 50.

Lure 50 includes a longitudinal slot 54 in which a pin 346 extending outwardly from line tie 340 is inserted. Pin 346 rides along slot 54, which pivots line tie 340 relative to a longitudinal axis 56 of lure 50. The pin and slot assembly provide additional direction adjustment for line tie 340 as line tie 340 moves between a first position that directs lure 50 to the left and a second position that directs lure 50 to the right as lure 50 is being reeled in.

Further, while pin 346 and slot 54 are shown in only lure assembly 300, those skilled in the art will recognize that line ties 140, 240 can also include pins that slide along a slot 54 in lure 50 as well.

As shown in the electrical schematic of FIG. 6A, a power source, such as, for example, two 1.5 Volt watch batteries 360, are electrically connected to motor 350 to provide electrical power to motor 350. Additionally, a controller board 362 controls motor 350.

A remote control device 370 is wirelessly connected to control board 362 to transmit wireless control signals to operate motor 350. Remote control device 370 can include "Left" and "Right" buttons 372, 374, respectively, that control the direction in which motor 350 rotates, thereby controlling the direction of motion of line tie 340 to steer lure 50 in a desired direction as lure 50 is being reeled in by an angler.

Figure 7:
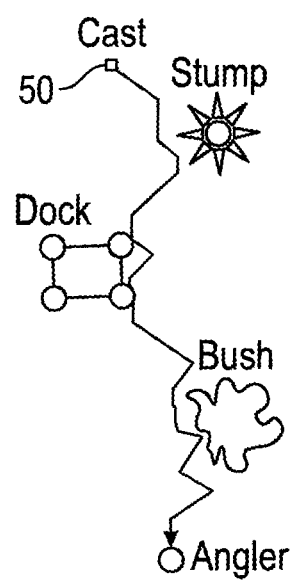
FIG. 7 is a schematic view showing a lure according to the present invention being reeled in with multiple direction changes throughout.

FIG. 7 shows how lure assemblies 100, 200, 300 can be used to generate multiple and varied direction changes as lure 50 is being reeled in, resulting in a life-like behavior of lure 50 that the inventor believes will attract fish to lure 50.

While exemplary embodiments of lure assemblies are discussed above and shown in the Figures, those skilled in the art will recognize that other structures can be provided that result in the inventive method of using only the movement of a line tie relative to a longitudinal axis of the lure assembly or the lure 50 itself, to redirect the track of the lure 50 to the left or right of a direction in which the lure 50 is being reeled in. Additionally, the movement of the line tie can result in movement of a rear portion that enhances the directional change of lure 50 and is within the scope of this invention.

Further, while line ties 140, 240, 340 are shown as being generally straight, those skilled in the art will recognize that line ties 140, 240, 340 can also be bent, curved, or otherwise non-liner to enhance the ability of line tie 140, 240, 340 to steer lure 50 as lure 50 is being reeled in.

It will be further understood that various changes in the details, materials, and arrangements of the parts which have been described and illustrated in order to explain the nature of this invention may be made by those skilled in the art without departing from the scope of the invention as expressed in the following claims.

I claim:

1. A method of redirecting a track of a fishing lure on a fishing line, the fishing lure having a body, a fishing lure longitudinal axis extending along a length of the body, a line tie extending outwardly from the body, and a re-positioning mechanism connected to the line tie, the re-positioning mechanism being activated by the fishing line, the method comprising the steps of:
    (a) using a fishing pole, casting the fishing lure into a body of water;
    (b) while the fishing lure is in the water, reeling in the fishing lure; and
    (c) moving the line tie between a first position and a second position such that, exteriorly of the body, the only movement is of the line tie, wherein the movement of the line tie between the first position and the second position changes a direction of travel of the fishing lure during step (b); wherein the re-positioning mechanism comprises a rotor assembly located in the fishing lure, the rotor assembly being operatively coupled to the line tie, and wherein step (b) comprises rotating the rotor assembly inside the fishing lure.

2. The method according to claim 1, wherein step (b) comprises alternatively applying tension to the fishing lure and releasing the tension on the fishing lure.

3. The method according to claim 1, wherein step (b) further comprises translating the rotor assembly along the fishing lure longitudinal axis.

4. The method according claim 1, wherein the re-positioning mechanism comprises a cam mechanism located inside the body, the cam mechanism being operatively connected to the line tie, and wherein step (b) further comprises activating the cam mechanism to move the line tie between a first side of the longitudinal axis and an opposing side of the longitudinal axis.

5. The method according to claim 1, wherein the rotor assembly comprises a rotor and wherein the line tie is rotatably connected to the rotor, and wherein step (b) rotates the rotor.

6. The method according to claim 1, wherein step (c) comprises moving the line tie between a first side of the longitudinal axis and an opposing side of the longitudinal axis.

7. The method according to claim 1, wherein step (b) comprises releasing tension on the line tie.

8. The method according to claim 1, wherein step (b) comprises applying tension to the line tie.

9. The method according to claim 1, wherein step (c) comprises the first position being to a first side of the longitudinal axis and the second position being to a second side of the longitudinal axis.

10. The method according to claim 1, wherein step (c) comprises the second end of the line tie being at a first angle relative to a first side of the longitudinal axis and wherein step (d) comprises the second end of the line tie being at a second angle, different from the first angle, relative to the first side of the longitudinal axis.

11. The method according to claim 1, wherein step (c) comprises moving the re-positioning mechanism longitudinally along the body.

12. The method according to claim 1, wherein step (c) comprises rotating the re-positioning mechanism within the body.

13. A method of redirecting a track of a fishing lure on a fishing line, the fishing lure having a body, a fishing lure longitudinal axis extending along a length of the body, a line tie extending outwardly from the body, and a re-positioning mechanism connected to the line tie, the re-positioning mechanism being activated by the fishing line, the method comprising the steps of:
    (a) using a fishing pole, casting the fishing lure into a body of water;
    (b) while the fishing lure is in the water, reeling in the fishing lure; and
    (c) moving the line tie between a first position away from the longitudinal axis and a second position away from the longitudinal axis such that, exteriorly of the body, the only the movement is of the line tie, wherein the movement of the line tie between the first position and the second position changes a direction of travel of the fishing lure during step (b); wherein the re-positioning mechanism comprises a rotor assembly located in the fishing lure, the rotor assembly being operatively coupled to the line tie, and wherein step (b) comprises rotating the rotor assembly inside the fishing lure.

* * * * *